United States Patent [19]

Kobelt

[11] Patent Number: 4,478,109

[45] Date of Patent: Oct. 23, 1984

[54] TWIN LEVER CONTROL ASSEMBLY

[76] Inventor: Jacob Kobelt, 6110 Oak St., Vancouver, British Columbia, Canada, V6M 2W2

[21] Appl. No.: 306,167

[22] Filed: Sep. 28, 1981

[51] Int. Cl.[3] .......................... G05G 5/08; F16H 57/06

[52] U.S. Cl. .................................... 74/878; 74/483 R; 192/0.098

[58] Field of Search ............................. 74/483 R, 878; 192/0.096, 0.098

[56] References Cited

U.S. PATENT DOCUMENTS

| | | | |
|---|---|---|---|
| 2,552,001 | 5/1951 | Dugas | 192/0.098 |
| 3,382,737 | 5/1968 | Manzolillo | 74/878 |
| 4,160,499 | 7/1979 | Baba | 74/878 X |

FOREIGN PATENT DOCUMENTS

| | | | |
|---|---|---|---|
| 936608 | 9/1963 | United Kingdom | 74/878 |

*Primary Examiner*—Allan D. Herrmann
*Attorney, Agent, or Firm*—Carver & Co.

[57] ABSTRACT

A twin lever control assembly for controlling two interrelated functions, such as a clutch/gearbox unit and a throttle of a marine power unit, has an interlock to permit movement of one lever only if the remaining lever is in a particular position. The assembly has an interlocking shaft fitted for movement between two connecting members which rotate with rotation of the respective lever. The shaft has a length greater than spacing between opposed faces of the connecting members, and is spring-urged towards the first connecting member. The connecting members have sockets to receive adjacent ends of the interlocking shaft to prevent movement of the receiving connecting member, the shaft being forced into the socket by either the spring force, or by a camming effect between the first member and the shaft.

14 Claims, 4 Drawing Figures

TWIN LEVER CONTROL ASSEMBLY

BACKGROUND OF THE INVENTION

1. Field of the Invention

The invention relates to a control lever assembly for controlling two inter-related functions, and is particularly adapted for, but not limited to, controlling a throttle and clutch/gearbox unit of a marine power unit.

2. Prior Art

Marine control assemblies for controlling a marine clutch/gearbox unit and engine have been used for many years and, to avoid damage to the engine and gearbox, it is common to provide an interlock of some type. The interlock permits changing gears only when the engine is at idle, and permits acceleration of the engine only when the gearbox is fully engaged in either forward or reverse, or is in neutral. Such devices are shown in U.S. Pat. No. 3,382,737 and No. 4,160,499 issued to Manzolillo and Baba respectively. Whilst such devices are suitable in some applications, they tend to be relatively complex and thus relatively costly to produce and maintain. Furthermore, it is considered desirable to provide for the clutch lever a resilient "feel" relating to engagement of neutral, forward and reverse gear positions, and neither of these patents disclose devices which would serve concurrently as an interlock and yet provide this feel for all three clutch lever positions. Resilient feel improves feedback for the operator so that the operator knows when the appropriate gear or neutral is engaged. The clutch lever is considered to be the primary lever for control as it controls direction of the vessel and thus positive and accurate clutch lever location is important. A partially engaged gear resulting from inaccurate location of the clutch lever in a prior art device would prevent operation of the throttle due to the interlock and this could present difficulties when docking the vessel. In particular, if the gear in a prior art device were only partially engaged, a strong operator applying large forces to the throttle lever could, in some instances, override the clutch/throttle interlock by deforming the interlock structure with excessive forces, and thus accelerate the engine possibly at an inappropriate time, with resulting damage to the vessel, gearbox, clutch and/or engine.

SUMMARY OF THE INVENTION

The invention reduces the difficulties and disadvantages of the prior art by providing a twin lever control assembly in which a desired location of a first lever can be attained using a resilient detent means to facilitate feeling the location. The resilient detent means also incorporates a positive and rugged mechanical interlock to prevent movement of the second lever unless the first lever is in a desired location. Also, the same interlock means prevents movement of the first lever unless the second lever is in a desired location. Furthermore, the interlocking means is designed so that excessive force applied to the levers is less liable to distort and over-ride the interlock means than prior art devices known to the inventor, thus preventing undesirable shifting of one lever when the remaining lever is inaccurately located.

A twin lever control assembly according to the invention controls two functions and has a body and first and second levers mounted for rotation relative to the body about respective lever axes for controlling a clutch/gearbox unit and engine speed respectively. The first and second levers have respective first and second connecting members adapted to rotate therewith and to cooperate with transmission means connected so as to control the functions. The body has a support member which is interposed between the two connecting members and has an opening therein. The assembly is further characterized by an interlocking shaft and a spring, the interlocking shaft being fitted in the opening of the support member for movement relative thereto between the connecting members. The shaft has first and second ends and a length greater than spacing between opposed faces of the connecting members. The spring cooperates with the interlocking shaft to urge the first end of the interlocking shaft towards the first connecting member. The first and second connecting members have sockets adapted to receive the first and second ends respectively of the shaft therein. The first connecting member has a plurality of sockets therein disposed on an arc centered on the first lever axis. The first end of the interlocking shaft and the sockets adapted to receive the first end therein are shaped so as to produce a camming effect on the interlocking shaft when the first connecting member rotates, which tends to force the shaft axially against spring force to produce a resilient feel for the first lever, when the first lever is rotated. The second end of the interlocking shaft and the socket adapted to receive the second end therein are shaped so as to produce essentially no camming effect on the interlocking shaft when a rotational force is applied to the second connecting member. Thus, there is essentially no tendency for the shaft to move axially when a rotational force is applied to the second lever. The first and second ends are spaced apart so that when the first end cooperates with one socket in the first connecting member, the second lever can be rotated, and when the second end cooperates with the socket in the second connecting member, the first lever can be rotated.

An alternative twin lever control assembly according to the invention is for controlling two functions and has a body and first and second levers mounted for rotation relative to the body about respective lever axes. The first and second levers have respective first and second connecting members adapted to rotate therewith and to cooperate with transmission means connectd so as to control the functions. The assembly is further characterized by the body having a generally semi-cylindrical wall having a generally semi-cylindrical inner surface. The body also has a web-like support member interposed between the two connecting members and having a semi-circular periphery connected to the inner surface of the body. The support member has an opening therein and a journalling means for the two levers. The assembly is also characterized by an interlocking shaft fitted in the opening of the support member for movement relative thereto between the connecting members. The shaft has first and second ends, and a length greater than spacing between opposed faces of the connecting members. A spring cooperates with interlocking shaft to urge the first end of the interlocking shaft towards the first connecting member. The first and second connecting members have sockets adapted to receive the first and second ends respectively of the shaft therein. The journalling means is a lever shaft centered on the axis and extending on opposite sides of the support member. Each lever has an inner end lever portion received on the lever shaft and adjacent the support member within a cavity defined in part by the cylindrical wall and the support member. Each lever also has an intermediate lever portion cranked outwardly from the inner portion to avoid interference with the cylindrical wall, and an outer lever portion disposed generally parallel to the inner lever portion. This provides two generally shallow Z-shaped levers disposed symmetrically of the body.

A detailed disclosure following, related to drawings, describes a preferred embodiment of the invention which is capable of expression in structure other than that particularly described and illustrated.

DETAILED DISCLOSURE

Figure 1:
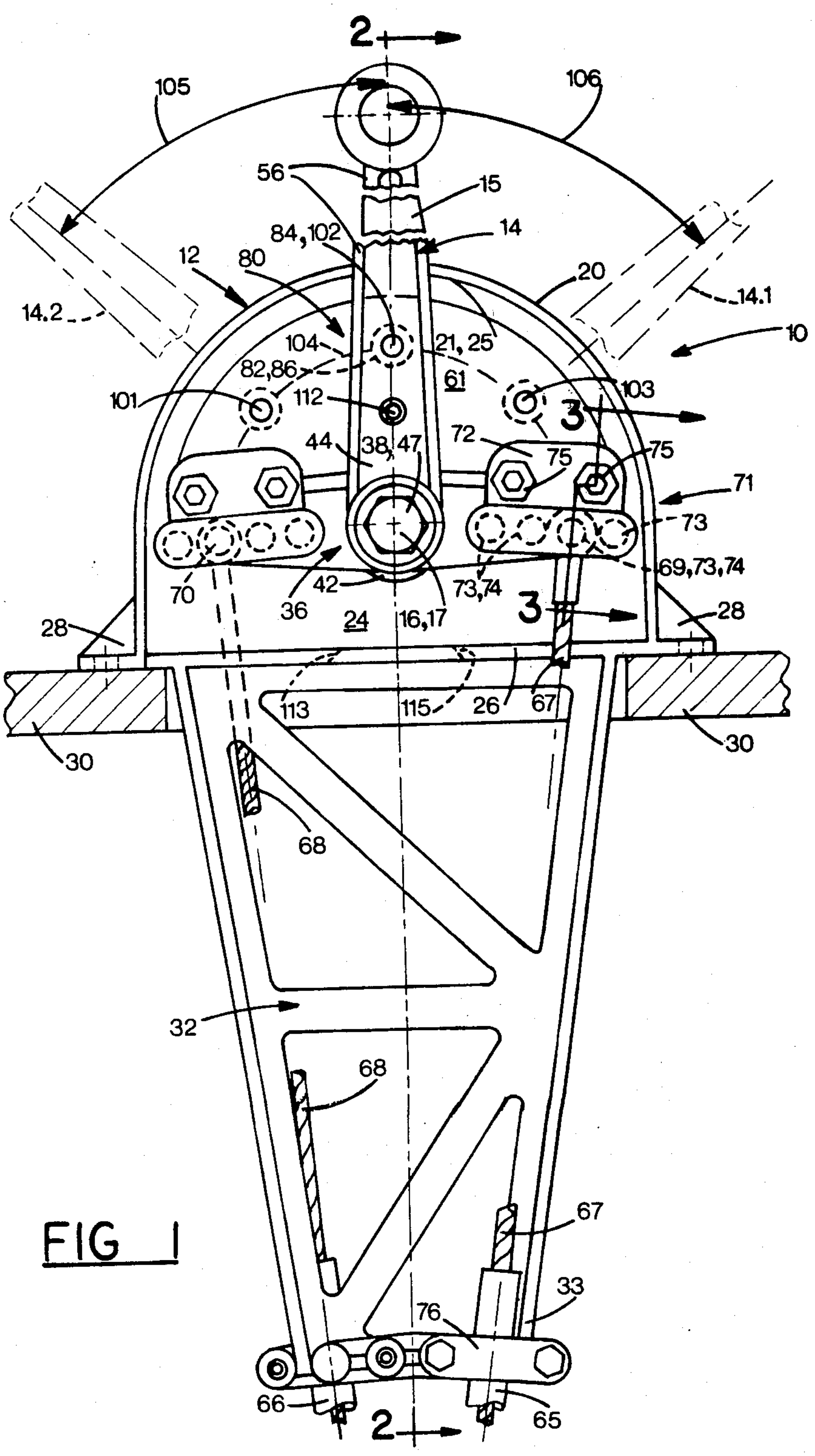
FIG. 1 is a simplified fragmented side elevation of a control assembly according to the invention, both levers being shown in an intermediate position.
Figure 2:
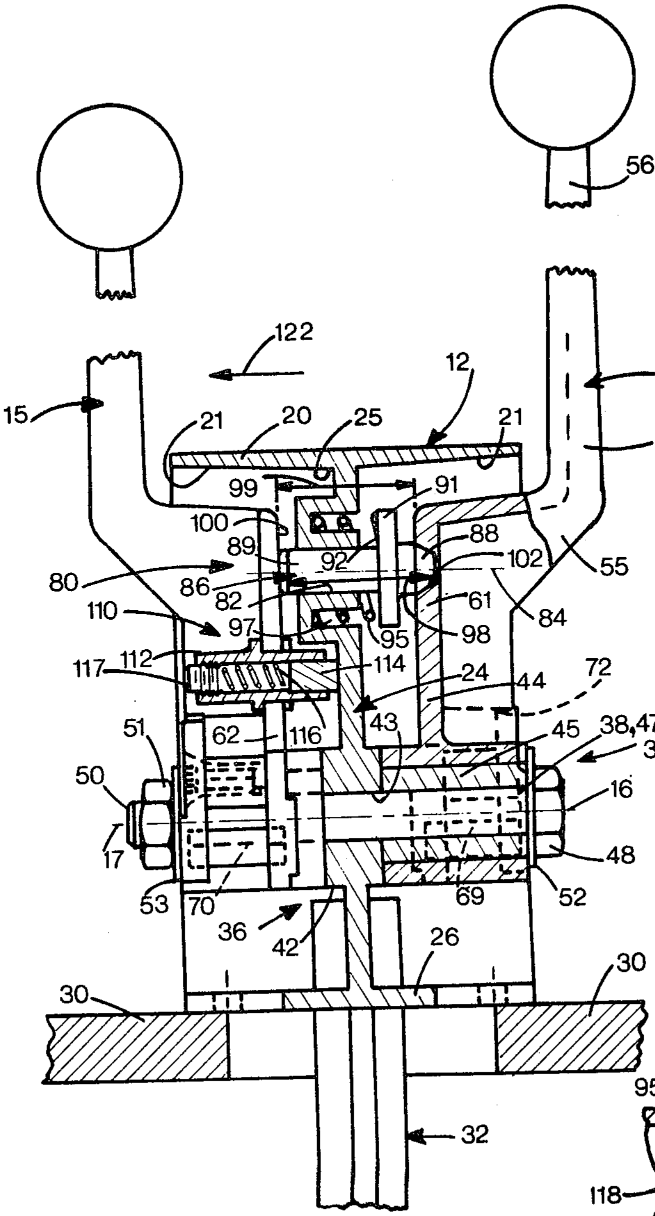
FIG. 2 is a simplified fragmented section on line 2—2 of FIG. 1.
Figure 3:
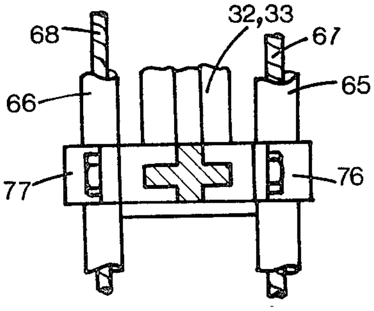
FIG. 3 is a simplified fragmented section of cable core connection means on line 3—3 of FIG. 1.
Figure 3:
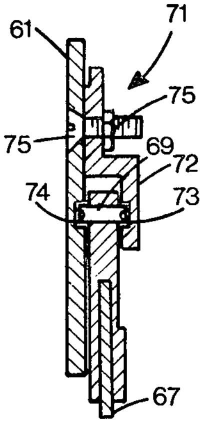

FIGS. 1 through 3

A twin lever control assembly 10 according to the invention has a semi-cylindrical hollow body 12 and first and second levers 14 and 15 mounted for rotation relative to the body about respective first and second lever axes 16 and 17. In this example, the axes 16 and 17 are aligned and thus rotate about a common axis, and the levers 14 and 15 operate a marine clutch/gearbox assembly and an engine respectively of a marine power unit, not shown, but clearly the assembly 10 can be used in many applications requiring control of two interrelated functions.

The body 12 has a generally semi-cylindrical wall 20 having a generally cylindrical inner surface 21. The body also has a support member 24 having a semi-circular upper periphery 25 connected to and complementary to the inner surface 21. The member 24 is connected at a mid position of the wall 20 and thus half portions of the wall 20 extend symmetrically from each side of the member 24. The member 24 extends downwardly to a base member 26 having undesignated openings therein to provide clearance for control cables, as will be described, and external brackets 28 for securing the assembly 10 to a control table 30. A control cable anchoring means 32 extends downwardly from the base member 26 to a lower end 33 thereof.

The support member 24 is a web-like member and has a journalling means 36 for the two levers, the means 36 being a lever shaft 38 centered on the lever axes and extending on opposite sides of the support member. The member 24 carries a boss 42 having an opening 43 to receive the shaft 38, and a sleeve 45 is carried on the shaft 38 to journal an inner portion 44 of the first or clutch lever thereon. A similar sleeve 46, broken outline, is fitted on the shaft 38 on an opposite side of the boss 42 and it can be seen that the shaft 38 is in fact a bolt 47 having a bolt head 48 and a threaded end 50 carrying a nut 51. Washers 52 and 53 are fitted between the sleeve 45 and the head 48, and between the nut 51 and the sleeve 46, and are sufficiently large to interfere with an end face of the respective lever to prevent the lever from sliding axially off the sleeve. This provides a simple journalling means for the levers which is cantilevered outwardly from each side of the support member, providing a simple and low cost, yet sturdy spindle for journalling both levers for rotation about a common axis of rotation. It can be seen that each lever has the respective inner lever portion thereof received on the lever shaft adjacent the support member within a cavity defined in part by a half portion of the cylindrical wall and the support member. The lever 14 has an intermediate portion 55 cranked outwardly from the inner portion 44 to avoid interference with the cylindrical wall 20, and an outer lever portion 56 disposed generally parallel to the inner lever portion so as to provide a shallow, generally Z-shaped lever. The throttle or second lever is similar and extends from an opposite side of the support member, and thus the assembly has two generally shallow Z-shaped levers disposed symetrically of the body.

The first and second levers 14 and 15 have respective and similar first and second connecting members 61 and 62 adjacent and connected to the respective inner portions of the levers so as to rotate therewith. The members 61 and 62 are semi-circular plate-like webs having upper arcuate peripheries concentric with the wall 20 and lower generally straight peripheries. Clutch and throttle push/pull control cables 65 and 66 have cores 67 and 68 respectively which have inner ends attached to pins 69 and 70 carried on the connecting members 61 and 62 respectively. Referring particularly to FIG. 3, a cable core connection means 71 has a bracket 72 secured by screws and nuts 75 to the connecting member 61 and has four recesses 73 disposed along a radius centered on the axis 16, as shown in broken line in FIG. 1. The recesses face and are aligned with four corresponding recesses 74 in the connecting member. The pin 69 is carried in an appropriate aligned pair of recesses spaced at a desired distance from the axis 16 to give the required throw of the cable. The throttle control cable is similarly connected to the connecting member 62 and it can be seen that the first and second connecting members cooperate with transmission means, that is the control cables, which are connected so as to control the functions, that is the clutch and throttle, as is common practice. The control cables 65 and 66 have undesignated sheaths which are connected with clamps 76 and 77 respectively at the lower end 33 of the anchoring means, and clearly, for some applications, conventional bowden cable or equivalents, or hydraulic and electrical devices, could be substituted for the push/pull cables.

An important feature of the assembly is an interlock means 80 which prevents actuation of one lever unless the other lever is in a particular location. As best seen in FIG. 2, the support member is interposed between the two connecting members and has an interlock opening 82 therein having an opening axis 84 disposed parallel to the axes 16 and 17. The interlocking means includes an interlocking shaft 86 fitted in the opening 82 for sliding axial movement relative thereto between the connecting members.

The interlocking shaft 86 has, at opposite ends thereof, a tapered or truncated conical first end 88 and an essentially non-tapered or cylindrical second end 89, and an annulus 91 extending around the shaft adjacent the tapered end. A compression coil spring 95 encircles a portion of the shaft 86 and the annulus 91 has a shoulder 92 to provide a stop means for the coil spring and the shaft. The spring has one end fitted in an annular recess 97 of the support means and an opposite end thereof butted against the annulus 91, and thus extends between the support member and the shoulder so as to urge the tapered end of the interlocking shaft towards the first member. It can be seen that the shaft 86 has a length 98 greater than spacing 99 between opposed faces of the connecting members, and that the end 89 is adjacent an inner face 100 of the member 62.

Referring to FIG. 1, the first connecting member 61 has three sockets or openings 101, 102 and 103 disposed therein on an arc 104 centered on the first lever axis. The sockets are arranged to provide an intermediate socket 102 disposed equally between the two outer sockets 101 and 103. The sockets have partially conically tapered side walls which are generally complementary to the tapered end 88 of the interlocking shaft, as best seen in FIG. 2 for the socket 102. The sockets are disposed on the connecting member so that the intermediate socket is engaged by the interlock means 80 when the clutch lever is in a neutral position, that is disposed vertically as shown in FIG. 1, and one of the two outer sockets is engaged by the interlock means when the clutch lever is in forward or reverse gear engaged positions 14.1 or 14.2, as shown in broken outline in FIG. 1. The outer sockets 101 and 103 are disposed at equal angles 105 and 106 from the neutral position, approximately 48°. When the end 88 is received in a recess there is a clearance between the member 62 and the end 89, thus permitting free swinging of the throttle lever. The above describes a resilient detent means for the clutch lever to indicate to the operator by a resilient "feel" when the lever 14 is accurately in neutral, forward or reverse engaged positions, assuming that the interlocking shaft can slide freely within the opening 82. Such free sliding can occur only when the throttle is at idle, to be described in greater detail with reference to FIG. 4.

The throttle member has a drag means 110 which includes a sleeve 112 fitted adjacent an inner portion of the throttle lever 15. The sleeve carries a cylindrical friction member 114 at an inner end thereof and a compression coil spring 116 within the sleeve is retained by a threaded cap 117 at an outer end of the sleeve. The spring 116 urges the friction member against the adjacent face of the support member and degree of drag can be adjusted by rotating the cap 117. Both the clutch lever and the throttle lever are limited in swinging by interference of lower portions of the respective connecting members with opposite edges 113 and 115 of the base member 26.

FIG. 4

Figure 4:
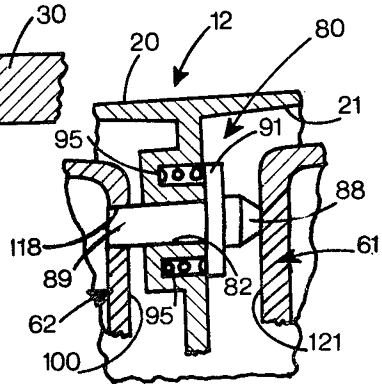
FIG. 4 is a simplified fragmented section of interlock means, in a plane similar to that of FIG. 2, with the interlock means shown in a condition when one lever is displaced from the intermediate position.

The connecting member 62 is shown in a position when the throttle lever 15 associated therewith is at idle, and the member 61 is shown in a position when the clutch lever 16 is between one of the three specific locations. The second connecting member 62 has a socket or opening 118 which has a size to receive the end 89 therein. The socket 118 is disposed circumferentially on the connecting member in a position such that, when the throttle lever 17 is at idle, as shown in FIG. 4, the socket 118 is aligned with the interlocking shaft 86. Because the clutch lever is shown in a position other than neutral, forward or reverse, the tapered end 89 has been moved out of the particular socket due to camming action of the complementary tapered surfaces. In FIG. 2, because the throttle is shown in a midstroke position, ie. not at idle, the socket 118 is not visible and will not be aligned with the interlocking shaft in that position.

When the non-tapered end 89 is received in the socket 118 of the connecting means 62, the spring 95 is compressed further from the position as shown in FIG. 2 because the tapered outer end 88 is now urged against an inner face 121 of the connecting member 61. When the non-tapered end 89 is received in the socket 118 there is little resistance to movement between the face 121 of the connecting member 61 and the end 88, thus permitting the clutch lever 14 to rotate until the tapered end 88 is received in one of the sockets after a further rotation of the lever through the requisite angle. Thus, the first connecting member has a socket adapted to receive the tapered end of the shaft therein, and the second connecting member has a socket to receive the non-tapered end of the shaft therein.

OPERATION

In operation, referring to FIG. 2, the clutch lever 14 is shown in neutral and the throttle lever is shown in a position other than idle, typically about half throttle with the throttle lever extending vertically upwards. In this position, the throttle lever can be moved through its full range up to full throttle and in so doing, the clutch lever is forced to remain at neutral as the non-tapered end 89 is closely adjacent the inner face 100 of the connecting member 62, thus essentially preventing axial movement of the interlocking shaft 86. If excessive force is applied to the clutch lever in this position, it is relatively unlikely that sufficient force would be generated by the tapered end 88 acting on the member 61 to distort the assembly to permit the clutch lever to be moved. The angles of the taper and conical face of the socket provides a relatively poor mechanical advantage to generate a distorting force, which contrasts with some prior art devices.

If the throttle lever 15 is returned to the idle position, the face 100 swings passed the end 89 and the socket 118 then becomes aligned with the interlocking shaft and this permits movement of the clutch lever 14 from the neutral position. As the lever 14 is swung from neutral, a camming action occurs between the tapered side walls of the socket 102 of the connecting member 61 and the tapered end 88 of the interlocking shaft, causing axial movement of the shaft in direction of an arrow 122, thus compressing the spring 95 and forcing the non-tapered end 99 into the aligned interlock socket 118 as seen in FIG. 4. The tapered end is now resiliently urged against the face 121 of the connecting member 61 and the clutch lever can be swung until the end 88 of the interlock member engages another socket. It can be seen that if the operator tries to move the throttle lever when the clutch lever is in a position such that the tapered inner end is not fully received in a recess, the interlocking shaft prevents movement of the throttle lever. Because the socket 118 has parallel cylindrical side walls which are complementary to the end 89, when the non-tapered end 89 is received in the socket 118, there is essentially no camming action generated which would distort the assembly if excessive force were applied to the throttle lever. Also there is essentially no tendency of the interlock shaft to be forced axially in a direction opposite to the arrow 122, thus maintaining the throttle lever at idle irrespective of the amount of force the operator might apply. This is assuming that the connecting members and web-like support member 24 are sufficiently stiff to resist deformation due to excessive forces applied to either of the levers. Thus, in summary, it can be seen that the first and second ends of the interlocking shaft are spaced apart so that when the first end cooperates with one socket in the first connecting member, the second lever can be rotated, and when the second end cooperates with the socket in the second connecting member, the first lever can be rotated.

ALTERNATIVES AND EQUIVALENTS

The interlock shaft 86 is shown with the tapered and non-tapered ends 88 and 89 adapted to fit into complementary sockets with a distinct difference in interaction between the ends and their respective recesses. The sockets 101, 102 and 103 have tapered side walls which are specifically designed to produce a camming effect on the complementary tapered or first end 88 of the shaft 86 when the first connecting member rotates, so as to force the shaft axially against the spring force to provide a resilient feel. Complementary shapes other than a taper or truncated conical shape can be substituted for the first end to produce a functionally similar camming and resilient feel. The socket 118 has an essentially cylindrical side wall complementary to the non-tapered or second end 89 of the shaft and is specifically designed to produce essentially no camming effect on the shaft, when a rotational force is applied to the second connecting member. Thus, if excessive force is applied to the throttle lever when the end 89 engages the socket 118, there is essentially no tendency for the shaft 86 to move axially, or for the assembly to distort. Clearly shapes other than cylindrical can be substituted for the second end to produce a functionally similar non-camming effect. Also the sockets are shown as openings passing clear through the connecting members, but this is not essential and equivalent blind recesses could be substituted.

I claim:

1. A twin lever assembly for controlling two functions, the assembly having a body and first and second levers mounted for rotation relative to the body about respective lever axes for controlling a clutch/gearbox unit and engine speed respectively, the first and second levers having respective first and second connecting members adapted to rotate therewith and to cooperate with transmission means connected so as to control the functions, the body having a support member interposed between the two connecting members and having an opening therein, the assembly being further characterized by:

(a) an interlocking shaft fitted in the opening of the support member for movement relative thereto between the connecting members, the shaft having first and second ends, and a length greater than the spacing between opposed faces of the connecting members, (b) a spring cooperating with the interlocking shaft to urge the first end of the interlocking shaft towards the first connecting member, (c) the first and second connecting members having sockets adapted to receive the first and second ends respectively of the shaft therein, the first connecting member having a plurality of sockets therein disposed on an arc centered on the respective lever axis, (d) the first end of the interlocking shaft and the sockets adapted to receive the first end therein being shaped so as to produce a camming effect on the interlocking shaft when the first connecting member rotates, which tends to force the shaft axially against spring force to produce a resilient feel for the first lever, when the first lever is rotated, (e) the second end of the interlocking shaft and the socket adapted to receive the second end therein being shaped so as to produce essentially no camming effect on the interlocking shaft when a rotational force is applied to the second member, so that there is essentially no tendency for the shaft to move axially when a rotational force is applied to the second lever, (f) the first and second ends being spaced apart so that when the first end cooperates with one socket on the first connecting member, the second lever can be rotated, and when the second end cooperates with the socket of the second connecting member, the first lever can be rotated.

2. A control assembly as claimed in claim 1 in which:

(a) the support member is a web-like member and has journalling means for the two levers.

3. A control assembly as claimed in claim 2 in which:

(a) the body has a generally semi-cylindrical wall having a generally semi-cylindrical inner surface, (b) the support member has a semi-circular periphery connected to the inner surface of the body.

4. A control assembly as claimed in claim 3 in which:

(a) the journalling means is a lever shaft centered on the axis and extending on opposite sides of the support member, (b) each lever has an inner lever portion received on the lever shaft and adjacent the support member within a cavity defined in part by the cylindrical wall and the support member, an intermediate lever portion cranked outwardly from the inner portion to avoid interference with the cylindrical wall, and an outer lever portion disposed generally parallel to the inner lever portion, so as to provide two generally shallow Z-shaped levers disposed symmetrically of the body.

5. A twin lever control assembly for controlling two functions, the assembly having a body and first and second levers mounted for rotation relative to the body about respective lever axes, the first and second levers having respective first and second connecting members adapted to rotate therewith and to cooperate with transmission means connected so as to control the functions, the assembly being further characterized by:

(a) the body having a generally semi-cylindrical wall having a generally semi-cylindrical inner surface, and a web-like support member interposed between the two connecting members and having a semi-circular periphery connected to the inner surface of the body, the support member having an opening therein and a jornalling means for the two levers, (b) an interlocking shaft fitted in the opening of the support member for movement relative thereto between the connecting members, the shaft having first and second ends, and a length greater than spacing between opposed faces of the connecting members, (c) a spring cooperating with the interlocking shaft to urge the first end of the interlocking shaft towards the first connecting member, (d) the first and second connecting members having sockets adapted to receive the first and second ends respectively of the shaft therein, (e) the journalling means being a lever shaft centered on the axis and extending on opposite sides of the support member, (f) each lever having an inner lever portion received on the lever shaft and adjacent the support member within a cavity defined in part by the cylindrical wall and the support member, an intermediate lever portion cranked outwardly from the inner portion to avoid interference with the cylindrical wall, and an outer lever portion disposed generally parallel to the inner lever portion so as to provide two generally shallow Z-shaped levers disposed symmetrically of the body.

6. A control assembly as claimed in claim 5 in which:

(a) the first end and the socket adapted to receive the first end therein are so shaped as to produce a camming effect on the interlocking shaft to force the shaft against the spring force when the first lever is swung to produce a resilient feel for the first lever, (b) the second end and the socket adapted to receive the second end therein are so shaped as to produce essentially no camming effect on the interlocking shaft so that there is essentially no tendency for the shaft to move axially when force is applied to the second lever.

7. A control assembly as claimed in claim 5 in which:

(a) the first end is a tapered end and the socket adapted to receive the tapered end has a complementary tapered side wall, (b) the second end is a non-tapered end and the socket adapted to receive the non-tapered end has a side wall complementary to the non-tapered end.

8. A control assembly as claimed in claim 1 in which:

(a) the support member is connected to an inner surface of the body.

9. A control assembly as claimed in claim 1 in which:

(a) the lever axes are aligned with each other to form a common axis of rotation, (b) the support member has a journalling means for journalling the two levers about the common axis.

10. A control lever assembly as claimed in claim 7 in which:

(a) the first end is truncated conical, (b) the second end is generally cylindrical, (c) the sockets adapted to receive the first end have partially conically shaped side walls, (d) the socket adapted to receive the second end has an essentially cylindrical side wall.

11. A control assembly as claimed in claim 5 in which:

(a) the first member has a plurality of sockets therein disposed on an arc centered on the respective lever axis and adapted to receive the first end therein.

12. A control assembly as claimed in claim 1 or 5 in which:

(a) the interlock shaft has a shoulder thereon to provide a stop means for the spring, (b) the spring extends between the support member and the shoulder so as to urge the interlock shaft outwardly from the support member.

13. A control assembly as claimed in claim 1 or 5 further including:

(a) drag means cooperating with the second connecting member and the support member to increase drag incurred during rotation of the second lever.

14. A control assembly as claimed in claim 5 in which the first lever is for operating a clutch and the assembly is further characterized by:

(a) the first connecting member having three sockets therein disposed on an arc centered on the first lever axis, the sockets being arranged to provide an intermediate socket disposed equally between two outer sockets, the intermediate socket being engaged by the interlock means when the clutch lever is in a neutral position, and one of the two outer sockets being engaged by the interlock shaft when the clutch lever is in forward or reverse gear engaged positions.

* * * * *